June 15, 1971     J. R. CUEN ET AL     3,584,365
EXTRACTOR DEVICE
Filed March 7, 1968     2 Sheets-Sheet 1
FIG. 1
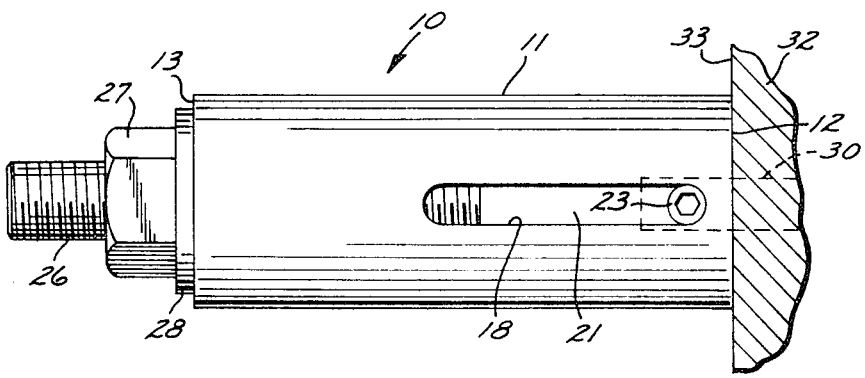
FIG. 2
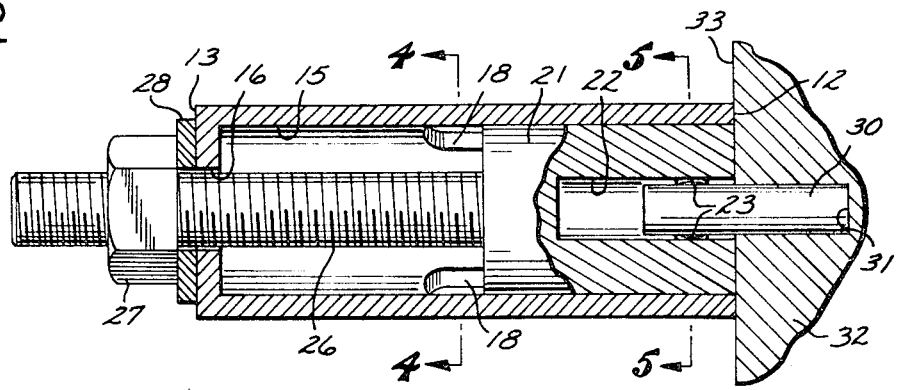
FIG. 3
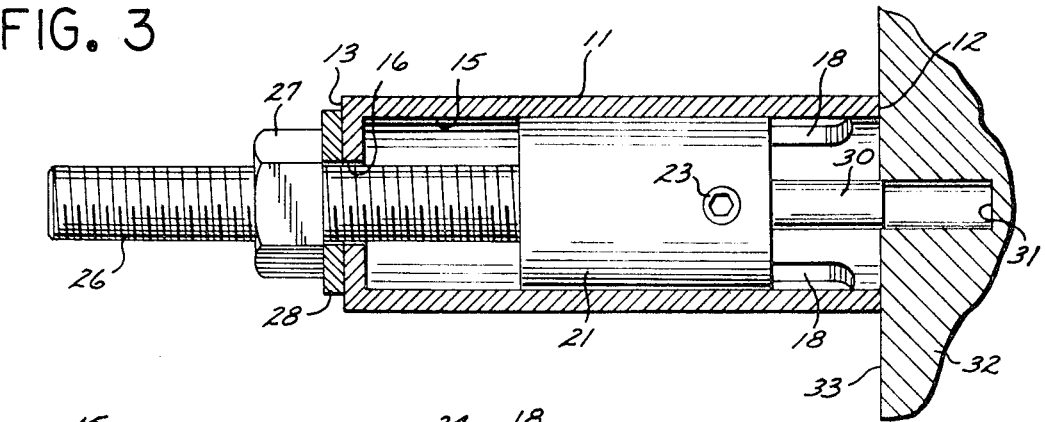
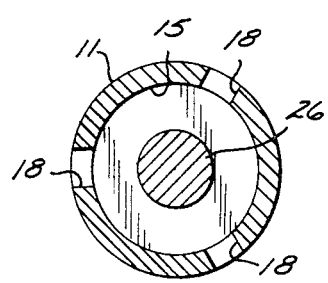
FIG. 4
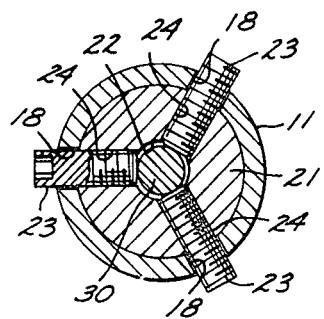
FIG. 5
INVENTORS.
JOE R. CUEN
ANGELO CATALDI
BY Noel G. Conway
ATTORNEY June 15, 1971  J. R. CUEN ET AL  3,584,365
EXTRACTOR DEVICE
Filed March 7, 1968  2 Sheets-Sheet 2
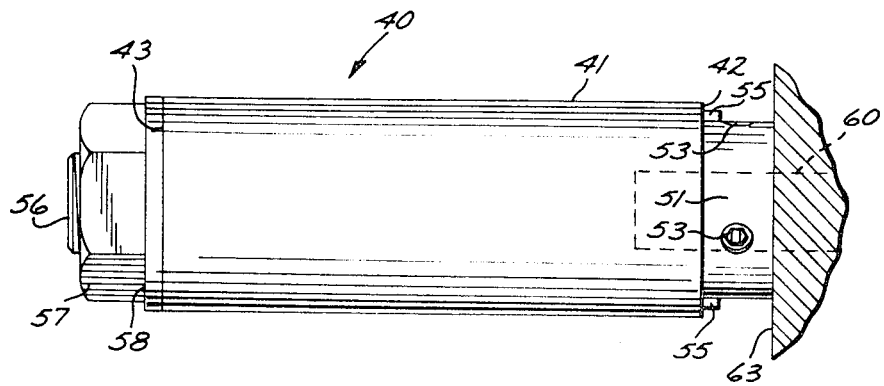
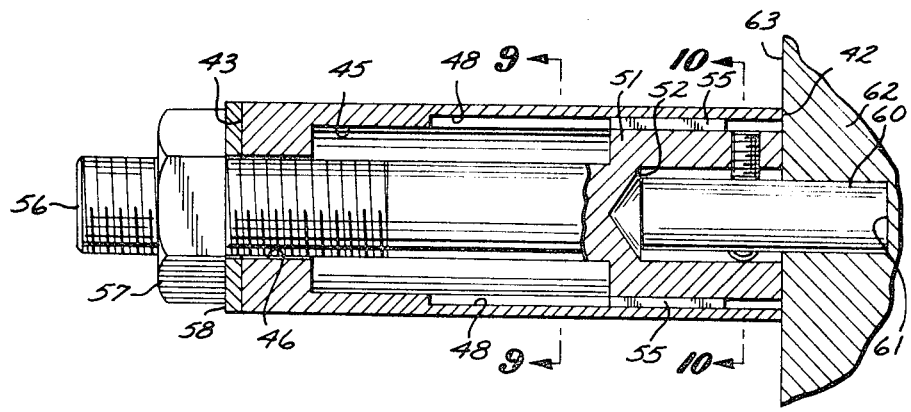
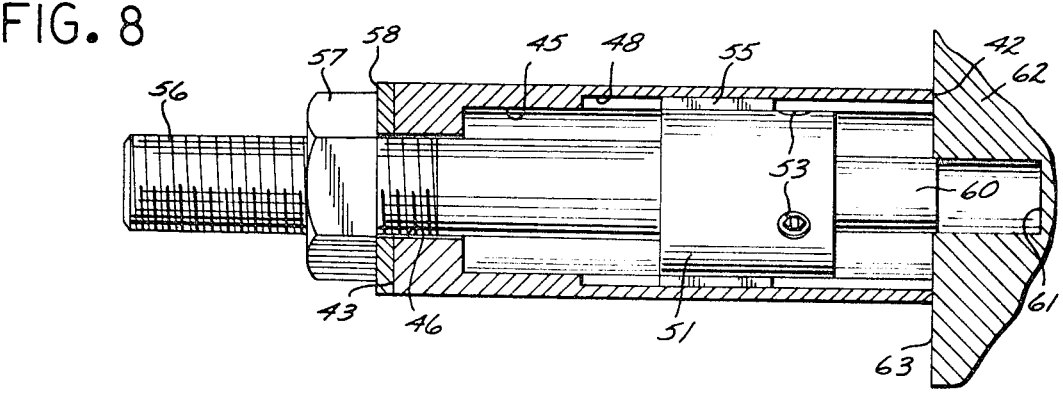
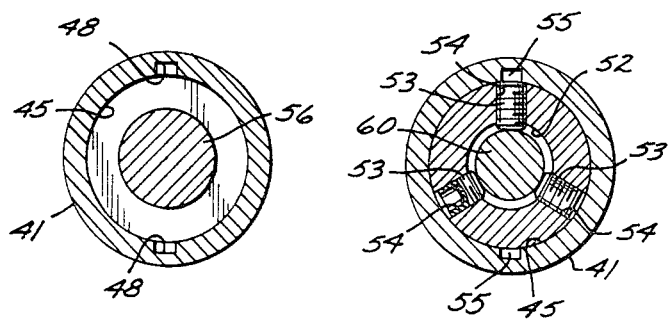
INVENTORS.
JOE R. CUEN
ANGELO CATALDI
BY Noel Y. Conway
ATTORNEY ered June 15, 1971

3,584,365
EXTRACTOR DEVICE
Joe Ray Cuen, 10909 Flory St., Whittier, Calif. 90606,
and Angelo Cataldi, 2929 Andros St., Costa Mesa,
Calif. 92626
Continuation-in-part of application Ser. No. 636,705,
Mar. 8, 1967. This application Mar. 7, 1968, Ser.
No. 711,251
Int. Cl. B23p 19/04
U.S. Cl. 29—256                                    1 Claim

ABSTRACT OF THE DISCLOSURE

An extractor device including a cylindrical sleeve having an axial bore in which is received a jaw block for movement along the axis of the sleeve, said jaw block having a centrally disposed hole with three screws equally spaced apart and extending into said jaw block at a right angle to said axis, there being provided means to prevent the jaw block from rotating about said axis relative to that sleeve, and the jaw block carrying a threaded shaft extending beyond one end of the sleeve and receiving thereon a nut which may be urged against that end of the sleeve to pull the jaw block towards that end when the nut is rotated on said shaft.

---

This is a continuation-in-part of our application Serial No. 636,705, filed Mar. 8, 1967, entitled Extractor.

This invention relates to extractor devices and more specifically to such devices which are particularly well suited for extracting a dowel pin from a hole in a block.

Considerable difficulty is encountered when it is desired to remove a dowel pin from a block. Primarily, this is because there are large frictional forces involved, and it is difficult to obtain sufficient purchase on the dowel pin to overcome these frictional forces. Dowel pin extractors have been provided in the past, however, they have encountered the disadvantages that they are too expensive to produce, to difficult to use, and do not grip the dowel pin sufficiently.

Embodiments of the present invention furnish a compact, easily used dowel pin extractor which grips the dowel pin very firmly in order to extract the pin.

Briefly, the invention incorporates a sleeve having a longitudinally extending axis and having a first and second end and with an opening at each of the ends. There is slidably received in that sleeve a jaw block for movement along that axis, which jaw block is normally disposed at the first end of the sleeve and has a centrally disposed hole on the axis adapted to receive the projecting portion of a dowel pin. At least one jaw is carried in that jaw block for movement at a right angle to the axis from a first position substantially out of said hole to a second position extending into the hole sufficiently to engage a dowel received in the hole. Additionally, means are provided operatively connected to the sleeve and to the jaw block for mechanically moving the jaw block away from said first end toward the second end of the sleeve—thus extracting the dowel pin.

With the foregoing in mind, it is a major object of this invention to provide an improved extractor.

Another object of this invention is to provide a light weight, compact dowel pin extractor which may be simply used.

A further object of this invention is to provide a low cost dowel pin extractor which can accommodate a variety of sizes of dowel pins.

It is a still further object of this invention to provide a dowel pin extractor which can be rapidly secured to the dowel pin, and then easily extract the pin.

Other and further objects of this invention will become apparent in the detailed description below in conjunction with the attached drawings wherein:

FIG. 1 is a side view of a first preferred embodiment of the present invention;

FIG. 2 is a partial cross sectional view of the extractor device shown in FIG. 1 taken along the longitudinal axis of the device;

FIG. 3 is a partial cross sectional view of the extractor device shown in FIG. 1 showing the movement of the parts during the extraction process;

FIG. 4 is a cross sectional view of the extractor device taken along line 4—4 in FIG. 2;

FIG. 5 is a cross sectional view of the extractor device taken along line 5—5 in FIG. 2.

FIG. 6 is a side view of a second preferred embodiment of the present invention;

FIG. 7 is a partial cross sectional view of the second embodiment of the present invention taken along the longitudinal axis of the device;

FIG. 8 is a partial cross sectional view of the device in FIG. 6 showing how the parts move during the extraction process;

FIG. 9 is a cross sectional view of the second preferred embodiment of the invention, taken along line 9—9 in FIG. 7; and FIG. 10 is a cross sectional view of the second preferred embodiment, taken along line 10—10 in FIG. 7.

Referring now to FIGS. 1 to 5, the first preferred extractor device, indicated generally by the arrow 10 will be described in detail. The extractor device 10 includes an elongated sleeve, or reaction member, 11 having a first end 12 and second end 13. An axially extending bore 15 opens through said first end 12 of the sleeve 11 while opening 16 in the second end 13 of the sleeve permits a member to pass from the bore in the direction of the said second end of the sleve.

For the purpose to be described, the sleeve 11 has a plurality of axially extending slots through the wall of the sleeve. As can be seen, these slots extend from a position approximately mid-length of the sleeve 11 to a position just short of the first end 12 of the sleeve.

Slidably received within the bore 15 is a jaw block 21 having a centrally disposed cavity 22 on the axis of the sleeve 11, which cavity faces in the same direction as said first end 12. A plurality of jaws extend through the wall of the jaw block 21 into the cavity 22. The jaws can take other shapes, however, it is preferred that the jaws take the form of screws 23 which are threaded into threaded holes 24. As can best be seen in FIG. 5, the screws 23 are spaced equally 120° apart and each extend into the cavity 22 at a right angle to the axis of the cavity.

The screws 23 have lengths which are such that they project beyond the sides of the jaw block 21 through the respective axial slots 18. Therefore, the screws 23 function to prevent the jaw block from rotating relative to the sleeve 11 about the axis of the sleeve. In the model shown, the screws 23 are of the type which receive an Allen wrench, however, headed screws can also be used.

Affixed to the jaw block 21 is a threaded shaft 26 which extends through the opening 16 in the second end 13 of the sleeve 11. This threaded shaft 26 received therearound a nut 27 which selectively presses against the second end 13 of the sleeve 11 to retract the jaw block 21 toward the said second end. Preferably, a washer 28 is used between the nut 27 and the said second end 13.

The manner in which the device 10 is used will now be described. In the drawings, there is shown an illustrative dowel pin 30 which has been previously pressed in a hole 31 in a block 32 with a part of the pin extending beyond face 33 of the block.

Firstly, the operator retracts the screws 23 insufficiently to clear the diameter of the dowel pin 30. Then, he backs the nut 27 off sufficiently that the jaw block 21 can be moved to the position shown in FIGS. 1 and 2 where the screws 23 engage the right end (as seen in FIGS. 1 and 2) of the slots 18. At this point, the operator places the device 10 in the position shown in FIG. 2 with the first end 12 of the sleeve engaging the face 33. Then, he tightens the screws 23 firmly onto the dowel pin 30 like the jaws of a vise. Then, the operator holds the sleeve 11 with one hand and rotates the nut 26 with the use of a wrench. Because the screws 23 grip the dowel pin 30, and also prevent the sleeve 11 from rotating relative to the screws, the sleeve 11 may be easily held against rotation. As the nut 27 is rotated clockwise (assuming a righthand thread) the jaw block 21 is moved to the left (as seen in FIGS. 2 and 3) thus extracting the dowel pin as illustrated in FIG. 3.

Referring now to FIGS. 6 to 10, a second preferred extractor device, indicated generally by the arrow 40, will now be described. As will be seen, this second device 40 differs from the first in that the jaws, e.g., screws, do not extend through block in the external sleeve. Rather, there is provided a key and keyway system to prevent the jaw block from rotating relative to the external sleeve.

More particularly, the extractor device 40 includes a longitudinal sleeve, or reaction member, 41 having a first end 42 and a second end 43. Said sleeve 41 has an axially extending bore 45 which opens through said first end 42 and opens through said second end 43 by means of an opening 46. Within the wall of the sleeve 41 there is provided a pair of oppositely disposed axially extending keyways, or grooves, 48 for a purpose to be described.

Within the bore 45 there is slidably received a jaw block 51 having an axially disposed cavity facing in the direction of said sleeve first end 42. As in the first embodiment, the jaw block 51 carries one or more jaws for the purpose of gripping the dowel pin. In the extractor device 40, the jaws preferably take the form of three headless screws 53 received in three threaded holes 54 through the wall of the jaw block. As best seen in FIG. 10, these screws 53 are spaced equidistant apart (120° apart) and they are of such length that they do not extend outwardly beyond the outer surface of the jaw block 51. Therefore, there does not have to be provided in the wall of the sleeve 41 slots which are comparable to the slots 18 in the extractor device 10. As can be seen, the screws 53 are adapted to receive an Allen wrench. Further, it should be noted that each of the screws 53 extends into the cavity 52 at a right angle to the axis of the cavity.

In order to prevent the jaw block 51 from rotating relative to the sleeve 41, there is provided a pair of keys, or projections, 55 which are slidably received in the above mentioned axial keyways, or grooves, 48.

As in the extractor device 10, the second extractor device 40 has a threaded shaft 56 extending from the jaw block 51 through the hole 46. The shaft 56 receives a nut 57 which can apply force against the second end 43 of the sleeve 41 as desired. Preferably, this force is applied through a washer 58.

The operation of the extractor device 40 will now be described in connection with a dowel pin 60 received in a hole 61 in a block 62 with one end of the dowel pin extending beyond face 63 of the block.

In this case, the operator will back the nuts 57 off sufficiently that the jaw block 51 may be extended beyond the first end 42 of the sleeve 41 as shown in FIG. 6. In this position, the operator can gain access to the screws 53 with the Allen wrench. The operator then places the jaw block 51 over the exposed surface of the dowel pin 60 tightens the screws 53 onto the dowel pin. Then, the operator moves the sleeve 41 to the position shown in FIG. 7 where the first end 42 engages the face 63. He then tightens the nut 57 with his hand until it reaches the position shown in FIG. 7. Then, holding the sleeve 41 in one hand he tightens the nut 57 with a wrench. By the action of the helical thread on the shaft 56, the jaw block is moved to the left (as seen in FIGS. 7 and 8) and the dowel pin 60 is extracted. At that point, the operator will rotate the nut 57 counterclockwise sufficient that the jaw block 51 can be moved back to the position (relative to the sleeve 41) shown in FIG. 6. He then loosens the screws 53 and the dowel pin 60 is removed.

As can be seen, the extractor device 40 presents a more attractive appearance than the extractor device 10. More importantly, the second extractor device can grip shorter dowel pins than the extractor device 10. This is because the distance between the right end of the slots 18 and the first end 12 prevent the jaws, or screws, 23 from being moved to a position as close to the face of the block as the jaws, or screws, 53 can be moved. The slots 18 could extend through to the first end 12 of the sleeve 11, and in such case, the sleeve would have, in effect, three legs. However, it is preferred that the slots 18 terminate short of the end in order to make a more stable structure and thereby reduce the thickness required for the wall of the sleeve.

While only a few embodiments of the present invention have been shown and described in detail, will be apparent to those skilled in the art that such is by way of illustration only and numerous changes may be made thereto without departing from the spirit of the present invention. Accordingly, it is our intention that the claims be limited solely by the appended claim.

We claim:
1. An extractor device, comprising:
 (a) a continuous surface elongated sleeve having a longitudinally extending hollow section of uniformed dimension which extends inwardly from one end thereof to a closed stop section with a central opening adjacent the other end thereof,
 (b) a jaw block of substantially less length than the sleeve hollow section which is slidably received therein and has an elongated shaft member which extends outwardly from the end of the said jaw block adjacent the closed stop section and through the central opening thereof,
 (c) the other end of the jaw block having a longitudinally extending bore which extends inwardly from the open end face a substantial portion of the longitudinal length of the jaw block,
 (d) the portion of the shaft member which extends through the central opening being threaded and having a tightening nut thereon which abuts the outer surface of the closed stop section of the sleeve,
 (e) the shaft member and its threaded section being of sufficient length to permit a substantial end section of the opened end of the jaw block to project outwardly beyond the opened one end of the sleeve,
 (f) the adjacent surfaces of the jaw block and the hollow section of the sleeve having longitudinally extending tongue and groove means for permitting nonrotative relative movement between the sleeve and the jaw block,
 (g) at least one radially extending tapped passage disposed immediately adjacent the open end of the jaw block and extending radially through the jaw block to the longitudinal bore thereof, (h) a locking screw disposed in the tapped passage which extends into the longitudinal bore to lock onto a member positioned therein, the length of the screw being such that when it is tightened on the member, it is completely clear of the inner surface of the sleeve, whereby in operation the jaw block can slide partially out of the sleeve, the locking screw tightened and the jaw block retracted into the sleeve without the locking screw interferring with the movement of the jaw block into and through the sleeve.

References Cited

UNITED STATES PATENTS

| | | | |
|---|---|---|---|
| 1,608,407 | 11/1925 | Macias | 29—263 |
| 1,828,758 | 10/1931 | Zimmerman | 29—256X |

FOREIGN PATENTS

| | | |
|---|---|---|
| 101,653 | 10/1916 | Great Britain. |

ANDREW R. JUHASZ, Primary Examiner

L. GILDEN, Assistant Examiner